United States Patent [19]

Duret et al.

[11] 4,398,756

[45] Aug. 16, 1983

[54] CYLINDRO-CONICAL PIPE JOINT

[75] Inventors: Jean Duret; Charles Soulier; Georges Trouillet, all of Aulnoye-Aymeries, France

[73] Assignee: Vallourec, S. A., Paris, France

[21] Appl. No.: 321,330

[22] Filed: Nov. 13, 1981

Related U.S. Application Data

[63] Continuation of Ser. No. 187,155, Sep. 15, 1980, abandoned, which is a continuation of Ser. No. 43,224, May 29, 1979, abandoned, which is a continuation of Ser. No. 780,847, Mar. 24, 1977, abandoned, which is a continuation-in-part of Ser. No. 370,141, Jun. 14, 1973, abandoned.

[51] Int. Cl.³ ............................................. F16L 25/00
[52] U.S. Cl. .................................... 285/334; 285/383
[58] Field of Search ................. 285/333, 334, 390, 94, 285/383, DIG. 16, 417, 355, 24, 27; 175/394

[56] References Cited

U.S. PATENT DOCUMENTS

| | | | |
|---|---|---|---|
| 1,973,848 | 9/1934 | Duffy | 285/390 X |
| 2,051,499 | 8/1936 | Siegle | 285/383 X |
| 2,056,112 | 9/1936 | Protin | 285/333 |
| 2,449,313 | 9/1940 | Naet | 175/394 X |
| 2,793,059 | 5/1957 | Woodling | 285/333 X |
| 2,893,759 | 7/1959 | Blose | 285/334 |
| 3,489,437 | 1/1970 | Duret | 285/334 X |

Primary Examiner—Dave W. Arola
Attorney, Agent, or Firm—Arnold, White & Durkee

[57] ABSTRACT

Separable joint for oil well pipe in which both the male and female members have a cylindrical threaded section adjacent a frusto-conical thread section, and the female member has an internal shoulder against which the end of the male member seals.

5 Claims, 5 Drawing Figures

CYLINDRO-CONICAL PIPE JOINT

This is a continuation of application Ser. No. 187,155, filed Sept. 15, 1980; which was a continuation of Ser. No. 43,224, filed May 29, 1979; which was a continuation of Ser. No. 780,847, filed Mar. 24, 1977; which was a continuation-in-part of Ser. No. 370,141 filed June 14, 1973, all abandoned.

SUMMARY OF THE INVENTION

This invention relates to a pipe joint which is particularly useful in the petroleum industry.

There is a well known type of pipe joint which is used principally to connect steel pipes in which threads formed on a frusto-conical surface at the end of the male member engage mating threads on a frusto-conical surface on the inside of the end of the female member. In one embodiment of this type of joint a seal is formed between the end of the male member and a corresponding shoulder positioned at the base of the threads of the female member. This shoulder comprises a central frusto-conical surface the top of which is directed toward the end of the female member and an outer surface which is an abutment surface, which may be frusto-conical in shape, and which slopes in the opposite direction so that when the end of the male member abuts the shoulder of the female member the central part of the shoulder has a tendency to urge the end of the male member outwardly while the outer zone of the shoulder urges it in the opposite direction.

The present invention relates to an improvement in this type of joint which makes it possible to retain all of the sealing properties of said joint without requiring as great precision in manufacture, particularly in the case of pipes of small diameter.

In known joints of this type it is necessary that there be precise alignment of the axes of the different surfaces machined on both the male and female members. In particular, any axial discrepancy between the machining of the different surfaces prevents proper sealing. These difficulties are greater in the case of pipes of small diameter than in the case of those of larger diameter because the inaccuracy in machining inherent in the machine tools used remain of the same order of magnitude and absolute value but become more important relatively when the diameter of the joint is smaller.

This problem becomes even more important when it is necessary to insure the interchangeability of the male and female members, that is to say, when it is necessary to be able to screw any randomly selected male member into any randomly selected female member, unscrew the two members, and repeat the operation many times.

Further, when the pipes connected by the joints possess a small diameter, the thickness of the pipes is also small and it is therefore difficult to provide, in the thickness of the metal, an abutment end of the male member having sufficient thickness and resistance while simultaneously executing the required threading which also causes a decrease of the metal thickness.

A theoretical solution to solve such problem would consist in providing the joint with a cylindrical threading instead of a frusto-conical threading. So, the U.S. Pat. No. 1,973,848 shows a drilling joint having a first part of threading being cylindrical and a second part on a frusto-conical surface. Nevertheless, such a previous joint needed on the one hand to increase considerably the metal thickness at the ends of the pipe and on the other hand, in spite of that thickness increase, to further increase the thickness of the part bearing the threadings due to the weakening caused by the thread groves. Such extra-thickness however presents several inconveniences. They are difficult to provide and need special manufacturing processes, they consume more metal, reduce the passage-way in the pipe and involve external protrudings. Such inconveniences are acceptable for drilling pipes but not for casings or tubings.

Moreover, the use of cylindrical threadings on pipe joints used in oil wells increases the difficulty of introducing and encasing the male member into the female member. In fact, the oil pipe being approximately 10 meters long is hung up by the upper end to heavy hoisting means and tends to rock to and fro so that at the beginning of the introduction the axes of the male and female members are not merging.

An object of the invention is to overcome the above-mentioned inconveniences.

Another object of the invention is to provide a joint for thin-walled pipes, and more particularly for pipes of small diameter wherein the thickness of metal at the level of the joint is small.

Another object of the invention is to provide a joint for connecting pipes used in oil wells, as for example casings or tubings, which allows an easy mounting of the joint in the well without false screwing or damaging of the threads.

Another object of the invention is to provide a joint for oil well pipes of a small diameter allowing easy introduction and encasing of the male member in the female member in spite of the worse working conditions in oil wells.

The present invention is intended to provide a new article of manufacture which consists of a joint for steel pipes which is particularly useful in the petroleum industry and capable of repeated make-up and separation. This joint is of the type in which the end of the male member forms a seal against a shoulder inside the female member, said shoulder comprising a central zone which is frusto-conical in shape, the top of which is directed toward the end of the female member, and an outer zone having a frusto-conical shape and which slopes in the opposite direction, the end of the male member having a shape mating with that of the shoulder of the female member. The joint is characterized by the fact that the threads used to assemble the joint are located on the external surface of the male member and the internal surface of the female member and are formed partly on a cylindrical surface carrying the major part of the threads, said cylindrical surface extending from the neighborhood of the shoulder in the case of the female member and from the end in the case of the male member, and partly on a frusto-conical surface following said cylindrical surface in the direction of the end of the female member.

In accordance with the invention the threads on the cylindrical surfaces of the male member and the female member are such that they may be screwed together without causing substantial wear and without substantial friction because of the slight play which exists between the crests of the threads of the male member and the bottoms of the threads of the female member as well as between the bottoms of the threads of the male member and the crests of the threads of the female member.

In accordance with a preferred embodiment of the invention the threads on the frusto-conical surfaces of the male and female members are so formed that, while the joint is being screwed together, there is some friction between the end of the female member and the male member and vice versa.

According to a preferred embodiment of the invention, the surface occupied by the frusto-conical threads is of the order of 15-25% of the surface occupied by the cylindrical threads, the effect of which is consequently preponderant during assembly of the joint.

In accordance with a preferred embodiment of the invention, the dimensions of the end of the male member and the corresponding part of the female member are such that there is a slight lateral play around the external surface of the male member between the front part of the male member which comes into abutment against the shoulder of the female member to form the seal and the beginning of the thread of the male member.

In accordance with the invention the angle between the generatrix of the central zone of the shoulder of the female member and a plane perpendicular to the axis of the joint is greater than the angle of friction between the end of the male member and the shoulder of the female member. This angle is, for example, between 10° and 30° and is preferably between 15° and 20°.

The shape and inclination of the outer zone of the shoulder of the female member may be varied within broad limits so long as this zone bears the corresponding part of the end of the male member to insure a seal by elastic or plastic deformation.

In one particular embodiment of the invention the outer zone of the shoulder of the female member may consist of a frusto-conical section the generatrices of which make an angle of 60° with a plane normal to the axis of the joint.

In accordance with the invention the lateral clearances which must exist between the male member and the female member along the part of the joint between the end of the conical threads and the outer zone of the sealing shoulder is of the order of several tenths of a millimeter, for example 0.2 mm for a cylindrical thread the diameter of which is about 40 millimeters. Because of the existence of this clearance between the male member and the female member the end of the male member can be exactly positioned with respect to the axis of machining of the shoulder of the female member even if there are slight defects in alignment between the end of the male member and the female member. It will thus be seen that, thanks to the invention, it is possible to always provide perfect coincidence between the axis of the shoulder of the female member and the axis of the corresponding surface on the end of the male member because the latter has a certain freedom of lateral movement and a flexibility sufficient to insure coincidence to the extent to which the lateral clearance between the cylindrical threads permits such displacement.

This advantage is particularly marked in the case of joints for pipes of small diameter in which a given machining tolerance has a greater relative importance than in the case of pipes of larger diameter.

Moreover, in the case of pipes of small diameter the formation of a cylindrical thread on its major part makes it possible to reduce the diametral bulk of the joint, which also constitutes an advantage. It is thus possible to provide an abutment having a section sufficiently large to resist a reasonably high make-up torque.

The threads on the frusto-conical surfaces have their crests and bottoms along generatrices parallel to the axis of the joint.

The bearing flanks of the threads of the threading, that is to say the flanks of the male threading who are oriented toward the free end of the female member and the flanks of the female threading oriented toward the internal abutment shoulder of the female member are either located in geometrical planes perpendicular to the geometrical axis of the joint, or slightly inclined in respect to said planes, so that the thread sections are of trapezoidal configuration with at least one of the lateral sides of the trapeze almost perpendicular to the base.

In accordance with a preferred embodiment of the invention the rear flanks of the threads of the female member are cut along an angle which is for example 45° so as to facilitate the introduction of the male member into the female member during the beginning of the assembly of the joints.

Moreover, the outer end of the female member can bear a chamber in flush alignment with the cuts of the rear flanks of the threads.

In accordance with the invention it is possible to assemble a pipe section having a male end and a section having a female end such as have been described, but it is also possible to assemble two tubes having male ends by using a sleeve having two female ends such as those which have been described.

In order that the invention may be better understood one embodiment thereof will now be described, purely by way of illustration and example, with reference to the accompanying drawings, on which:

Figure 1:
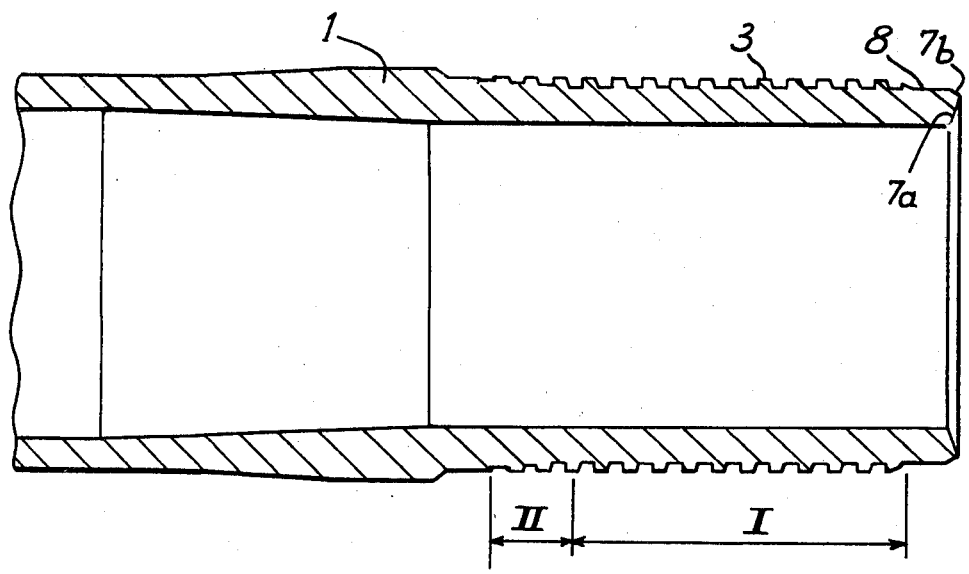
FIG. 1 is a schematic sectional view of the end of a male member according to the invention.
Figure 2:
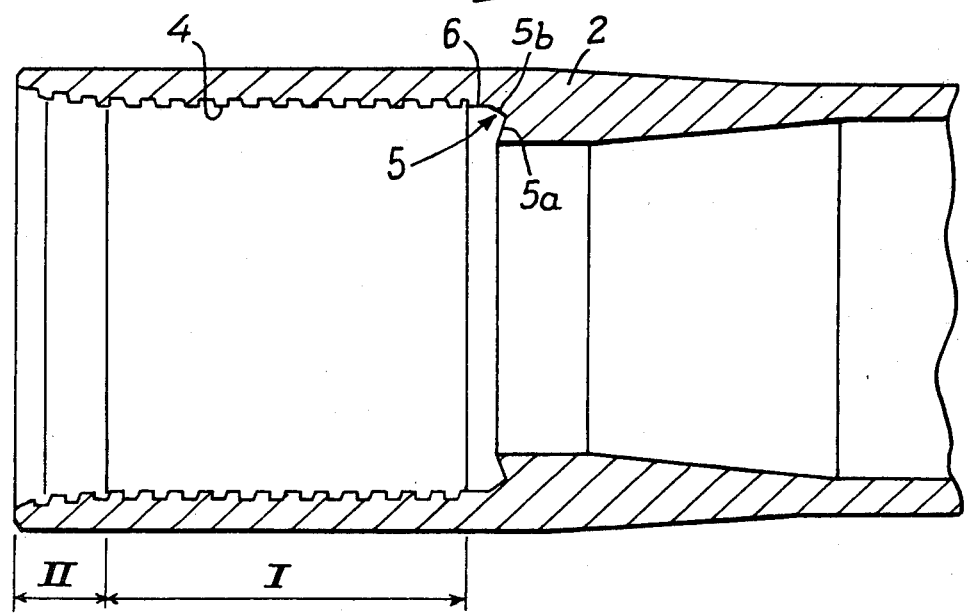
FIG. 2 is a schematic sectional view of the end of a corresponding female member.
Figure 3:
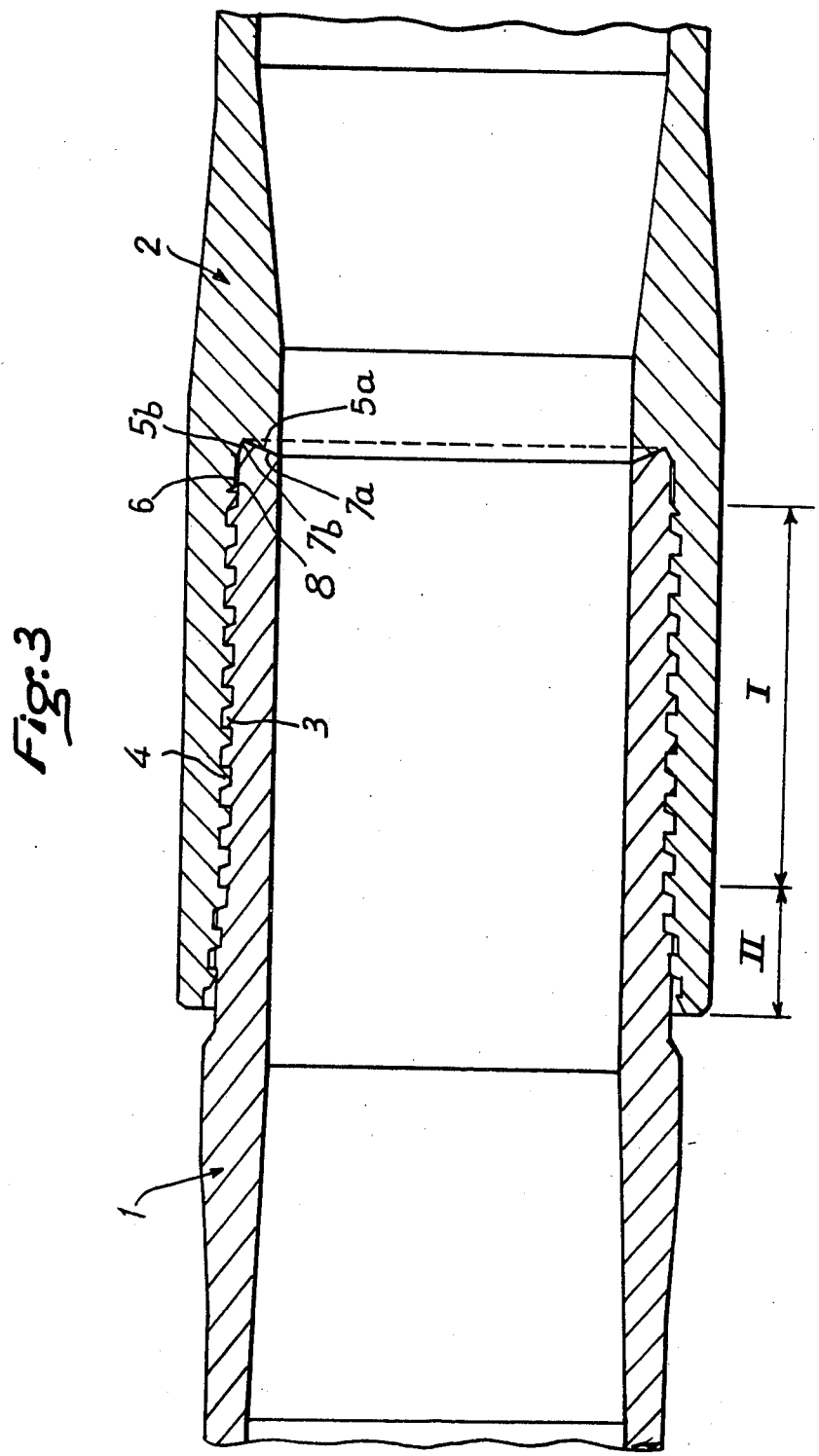
FIG. 3 is a sectional view of the assembly of the two members of FIGS. 1 and 2.

FIGS. 1, 2 and 3 show the ends of the male member 1 and the female member 2. These two members are assembled by means of a cylindro-conical thread 3 formed on the periphery of the end of the male member which engages in a cylindro-conical thread 4 formed on the internal surface of the end of the female member 2. The three Figures show the cylindrical threaded zone I and the frusto-conical threaded zone II.

The drawing also shows the internal shoulder 5 of the female member, which comprises a central zone 5a which is frusto-conical in shape (the top of the cone being directed toward the end of the female member). The conicity of this frusto-conical part (the angle between the generatrix and the plane perpendicular to the axis of the tube) may be, for example, 20°.

The Figures also show the outer zone 5b of the shoulder 5. In one particular embodiment, the outer zone 5b has a frusto-conical shape with the top of the cone directed toward the inside of the female member, the conicity (the angle between the generatrix and a plane perpendicular to the axis of the pipe) being in one particular embodiment, 60°.

FIG. 2 also shows how the outer zone 5b of the shoulder 5 is connected to the threads 4 by a surface 6.

The end of the male member also comprises a bearing surface 7a the shape of which corresponds to the zone 5a of the shoulder. This bearing surface 7a extends inwardly to meet a surface 7b, the shape of which corresponds to that of the peripheral zone 5b.

The bearing surface 7b of the male member is connected to the threads 3 by a surface 8.

FIG. 3, which represents the assembly of the two members, shows how the bearing surface 7a of the male member comes into abutment against the central zone 5a of the shoulder, while the surface 5b of the male member comes into abutment against the outer zone 5b of the shoulder 5.

It also shows the lateral clearance between the surfaces 6 and 8.

In a variation of the illustrated embodiment the surfaces 5b and 7b may be directly connected to the threads 4 and 3 of the male member and the female member respectively without any intermediate surfaces 6 and 8.

Moreover, it is obvious that the part of the external surface of the male member which is positioned between the threads 3 and the bearing surface 7a need not have a shape rigorously identical to that of the corresponding surface of the female member.

In particular, this surface of the male member may be subjected during assembly to a permanent or elastic deformation when it is brought into abutment against the corresponding surface of the female member or approaches it.

Moreover, it is not necessary for the surface of the male member between the surface 7a and the thread to bear throughout its length against the corresponding surface of the female member.

Figure 4:
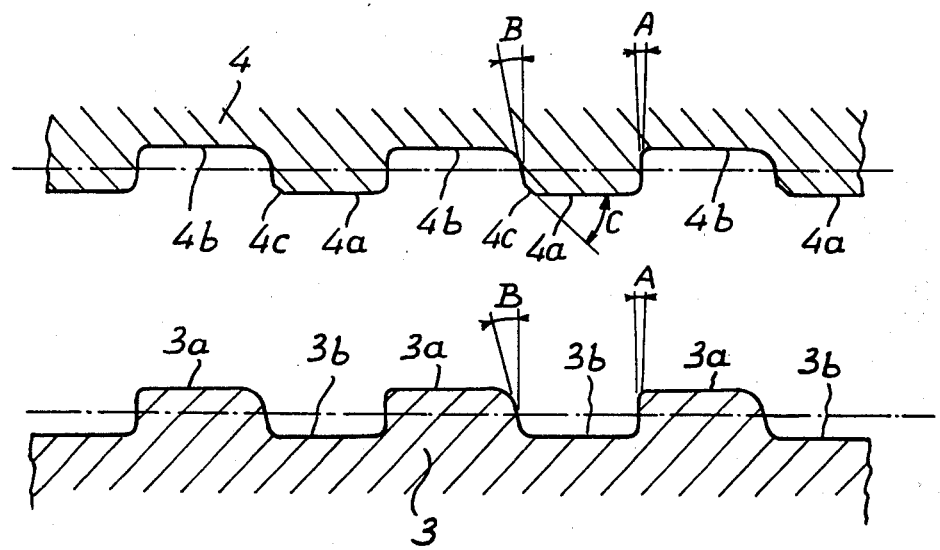
FIG. 4 is a sectional view on a larger scale showing the threads of the cylindrical portion of the male and female member.

FIG. 4 is a sectional view on a larger scale showing the cylindrical threads 3 and 4 of the male and female members.

FIG. 4 shows the crests 3a and the bottoms of the threads 3b of the threads 3, as well as the crests 4a and the bottoms of the threads 4b of the threads 4. In order to screw the cylindrical threads of the male member into the cylindrical threads of the female member without friction the following geometric conditions must obtain:

a. The front and rear flanks of each thread must make a slight angle with respect to the perpendicular to the axis of the threads. FIG. 4 shows the angle A between the front flank of the thread and a perpendicular of the axis to the pipe and the angle B between the rear flank of the thread and a perpendicular to the axis of the pipe.

In one particular embodiment of the invention the angle A is 3° while the angle B is 10°.

b. The diameter of the crests 3a of the threads 3 of the male member is less than the diameter of the bottoms 4b of the threads 4 of the female member.

c. The diameter of the crests 4a of the thread of the female member is greater than the diameter of the bottom 3b of the threads of the male member.

Further, the different threads have a trapezoidal configuration with the height of a thread being no greater than the half of the width of the thread.

In this way cylindrical threads are provided which permit the members to be screwed together without substantial effort and which permit a slight lateral displacement of the male member inside the female member so as to permit the end of the male member to be correctly positioned on the shoulder of the female member.

In the embodiment of FIG. 4 the rear flanks of the threads of the female threads 4 are beveled at 4c along an angle C equal to 45°. This characteristic is not, however, essential.

Figure 5:
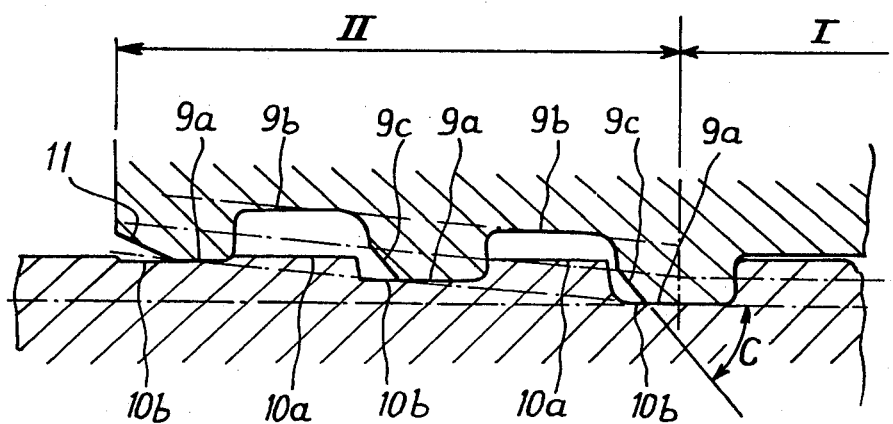
FIG. 5 is a schematic sectional view showing the frusto-conical threads of the male and female members assembled together.

FIG. 5 shows the assembly of the frusto-conical threads of the male and female member. This Figure also shows the zone 2 having frusto-conical threads and the zone 1 having cylindrical threads, which zones have been already described.

In the embodiment shown on FIG. 5 the conicity of the frusto-conical threads with respect to the axis of the tube is 15%. It will be seen in FIG. 5 that the crests of the threads 9a and the bottoms of the threads 9b of the female member, as well as the bottoms of the threads 10b of the male member remain parallel to the axis of the tube to make it possible, in this particular embodiment, to completely machine the threads with a single tool.

FIG. 5 shows that the crests of the threads 10a of the male member are at an angle to the conicity of the threads such that they lie in a cylindrical locus.

The rear flanks of the female threads 9c are also bevelled along an angle C which is, in the case illustrated 45°, so as to facilitate the introduction of the male threads into the female threads.

In like manner, the corner which connects the end surface of the female member to its threads is bevelled at 11 which, in the present case at an angle of 20° with respect to the axis of the joint, so as to facilitate the introduction of the male member into the female member.

The invention as described allows an easy introduction and screwing for the connection of the male and female members of the joints in spite of the bad working conditions on oil fields. When introducing, the front part of the male member is first guided by the chamfer located at the free end of the female member and then guided by the truncated parts of the last threads of the female member, and the female member is further guided due to the flat crests of the threads who allow a good sliding of the end of the male member and avoid all risks of jamming. It is therefore possible to achieve a good and easy screwing in spite of the fact that the long pipes are hung up by their upper end remote from the screwing zone.

It will, of course, be appreciated that the embodiment which has been described has been given purely by illustration and may be modified as to detail without thereby departing from the basic principles of the invention.

In particular, the friction provided by the frusto-conical portion of the threads is selected as a function of the resistance of unscrewing which the joint is intended to have.

It will be noted, in effect, that because of the existence of the cylindrical threads the limitation on the screwing is solely determined by the abutment of the end of the male member on the shoulder of the female member. It follows that the screwing torque, which is a function of the coefficient of friction may be determined with great precision, the friction of the frusto-conical section II being principally designed to prevent vibrations, rotations and flexings from causing separation of the joint.

What is claimed is:

1. In a separable joint for metal pipes in which a seal is formed between the end of a male member and a shoulder formed on the inside of a female member, said shoulder comprising a central frusto-conical zone the smaller end of which is directed toward the end of the female member and a frusto-conical outer zone which slopes in the opposite direction, the end of the male member having a central zone corresponding to said central zone of the female member and an outer zone having a shape which mates approximately with said outer zone of said female member, the end of said male member being provided with external threads and the end of said female member with internal threads, the improvement according to which the threads on each member lie partly on a cylindrical surface occupying the major portion of the threaded part of said member, said cylindrical surface extending from a point near said female shoulder in the case of said female member and the said end of said male member in the case of said male member, and partly on a frusto-conical surface near said end in the case of said female member and more remote from said end than said cylindrical threads in the case of said male member, wherein said frusto-conical threads occupy a surface from 15 to 25% as long as that occupied by said cylindrical threads, said threads having roots and crests substantially parallel to the geometrical axis of said joint, the axial width of said threads being substantially greater than the height of the threads, the flanks of the threads on both the male and the female members which come into contact during the make-up of the joint being substantially perpendicular to the axis of the joint, throughout the cylindrical part of the threads there being a clearance between the crests of the threads of the male member and the bottoms of threads of the female member, and between the bottoms of the threads of the male member and the crests of the threads of the female member, the rear flanks of the threads of the female member lying on said frusto-conical surface being bevelled to facilitate the insertion of said male member and the end of said female member having a conical entrance to facilitate said insertion.

2. Joint as claimed in claim 1 in which the cylindrically threaded surfaces are dimensioned to produce relatively little friction when screwed together.

3. Joint as claimed in claim 1 in which the threads on the frusto-conical surfaces are dimensioned to produce some friction between the end of the female member and the male member as the joint is being made up.

4. Joint as claimed in claim 1 in which there is a slight clearance around the external surface of the male member between the end of the male member which bears on the shoulder of the female member to produce the seal and the beginning of the thread of the male member.

5. Joint as claimed in claim 1 in which the angle between the generatrix of the central zone of the shoulder of the female member and a plane perpendicular to the axis of the joint is greater than the angle of friction between the end of the male member and the shoulder of the female member, the angle being the generatrix and perpendicular plane being between 10° and 30°.

* * * * *